(12) United States Patent
Ohishi et al.

(10) Patent No.: US 10,948,886 B2
(45) Date of Patent: Mar. 16, 2021

(54) INFORMATION PROCESSING APPARATUS, INFORMATION PROCESSING SYSTEM, AND METHOD FOR CONTROLLING DEVICE

(71) Applicants: Tsutomu Ohishi, Tokyo (JP); Akira Nagamori, Kanagawa (JP)

(72) Inventors: Tsutomu Ohishi, Tokyo (JP); Akira Nagamori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/584,023

(22) Filed: Sep. 26, 2019

(65) Prior Publication Data
US 2020/0019132 A1    Jan. 16, 2020

Related U.S. Application Data

(63) Continuation of application No. 15/820,883, filed on Nov. 22, 2017, now Pat. No. 10,466,666.

(30) Foreign Application Priority Data

Nov. 30, 2016    (JP) .............................. JP2016-232532

(51) Int. Cl.
  *G05B 15/02*   (2006.01)
(52) U.S. Cl.
  CPC .................... *G05B 15/02* (2013.01)
(58) Field of Classification Search
  USPC ........................................................ 700/28
  See application file for complete search history.

(56) References Cited

U.S. PATENT DOCUMENTS

| | | | |
|---|---|---|---|
| 5,798,738 A | * | 8/1998 | Yamada ............. H04N 1/00204 345/2.3 |
| 6,522,935 B1 | | 2/2003 | Imaizumi et al. |
| 7,684,074 B2 | | 3/2010 | Reddy et al. |
| 8,429,435 B1 | | 4/2013 | Clayton et al. |

(Continued)

FOREIGN PATENT DOCUMENTS

| | | |
|---|---|---|
| JP | 2008-152535 A | 7/2008 |
| JP | 2008-244634 A | 10/2008 |

(Continued)

*Primary Examiner* — Mohammad Ali
*Assistant Examiner* — Joshua T Sanders
(74) *Attorney, Agent, or Firm* — Harness, Dickey & Pierce, P.L.C.

(57) ABSTRACT

An information processing apparatus controls one or more processes of one or more devices belonging to a group based on data transmitted through a network from one or more devices belonging to the same group. The apparatus includes a memory and circuitry. The memory stores, on a group-by-group basis, policy data and a control flow. The circuitry makes the control flow effective, in a case in which at least one process to be executed when at least one condition is satisfied is permitted or is not prohibited to a user from whom a request for execution of the control flow is accepted, according the policy data. The circuitry controls the at least one process of the at least one device according to the control flow that is made effective, on a group-by-group basis.

18 Claims, 13 Drawing Sheets

(56) References Cited

U.S. PATENT DOCUMENTS

| | | | |
|---|---|---|---|
| 2007/0106905 A1* | 5/2007 | Ito | G06F 21/31 |
| | | | 713/184 |
| 2008/0259384 A1 | 10/2008 | Ito | |
| 2009/0216854 A1 | 8/2009 | Ogasawara | |
| 2011/0040847 A1 | 2/2011 | Sato et al. | |
| 2014/0040462 A1 | 2/2014 | Harada | |
| 2014/0244040 A1 | 8/2014 | Alberth, Jr. et al. | |
| 2014/0364968 A1 | 12/2014 | Ishizaka et al. | |
| 2015/0020150 A1* | 1/2015 | Hagiuda | H04L 41/0853 |
| | | | 726/1 |
| 2015/0344188 A1 | 12/2015 | Sasaki et al. | |

FOREIGN PATENT DOCUMENTS

| | | |
|---|---|---|
| JP | 2011-227818 A | 11/2011 |
| JP | 2012-247928 A | 12/2012 |
| JP | 2014-032627 A | 2/2014 |
| JP | 2014-235441 A | 12/2014 |
| JP | 2015-219566 A | 12/2015 |
| WO | WO-2014/024442 A1 | 2/2014 |

* cited by examiner

| NAME OF CONTROL FLOW | CONDITION | | PROCESS | |
|---|---|---|---|---|
| AIR CONDITIONER CONTROL | 8 TO 20 O'CLOCK ON WEEKDAYS | TEMPERATURE SENSOR 28°C OR HIGHER | TURN ON AIR CONDITIONER | SET TEMPERATURE TO 25°C |
| AIR CONDITIONER CONTROL | 8 TO 20 O'CLOCK ON WEEKDAYS | TEMPERATURE SENSOR 22°C OR LOWER | TURN ON AIR CONDITIONER | SET TEMPERATURE TO 25°C |
| ... | ... | ... | ... | ... |

FIG. 13

IoT DEVICE CONTROL POLICY

| NAME OF IoT DEVICE | ROLE | PROCESS | | |
|---|---|---|---|---|
| AIR CONDITIONER | ADMINISTRATIVE USER | POWER ON/OFF PERMITTED | TEMPERATURE SETTING PERMITTED | ... |
| AIR CONDITIONER | GENERAL USER | POWER ON/OFF PROHIBITED | TEMPERATURE SETTING PROHIBITED | ... |
| TEMPERATURE SENSOR | ALL | TEMPERATURE READ-OUT PERMITTED | | ... |

INFORMATION PROCESSING APPARATUS, INFORMATION PROCESSING SYSTEM, AND METHOD FOR CONTROLLING DEVICE

CROSS-REFERENCE TO RELATED APPLICATION

This patent application is a continuation of and claims priority under 35 U.S.C. § 120/121 to U.S. application Ser. No. 15/820,883, filed Nov. 22, 2017, which is based on and claims priority pursuant to 35 U.S.C. § 119(a) to Japanese Patent Application No. 2016-232532, filed on Nov. 30, 2016, the entire disclosure of which are hereby incorporated by reference herein in its entirety.

BACKGROUND

Technical Field

The present disclosure relates to an information processing apparatus, a method for controlling a device, and an information processing system.

Description of the Related Art

Many devices including personal computers (PCs) are connected via a network nowadays. Further, not only the Internet communications but also network services called clouds, Web services, and Application Service Providers (ASP) are expanding.

The Internet of Things (IoT) is also known, which connects things including devices other than the personal computers to the Internet.

With application of the IoT communication network, not only computers and computer networks but also everyday things can be readable, recognizable, position-identifiable, addressable and controllable.

Further, machine-to-machine (M2M) communication is also known, in which machines connected to a communication network perform communication without intervention by persons and automatically execute appropriate machine control, etc.

SUMMARY

An information processing apparatus controls one or more processes of one or more devices belonging to a group based on data transmitted through a network from one or more devices belonging to the same group. The apparatus includes a memory and circuitry. The memory stores, on a group-by-group basis, policy data in which at least one of a user to whom at least one process of at least one device is permitted and a user to whom at least one process of at least one device is prohibited is set. The memory stores, on a group-by-group basis, a control flow that associates at least one condition with at least one process of at least one device that is to be executed when the at least one condition is satisfied. The circuitry makes the control flow effective, in a case in which the at least one process to be executed when the at least one condition is satisfied is permitted or is not prohibited to a user from whom a request for execution of the control flow is accepted, according the policy data. The circuitry controls the at least one process of the at least one device according to the control flow that is made effective, on a group-by-group basis.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 13 is an illustration of an example of an IoT device control policy according to an embodiment of the present disclosure;

Figure 1:
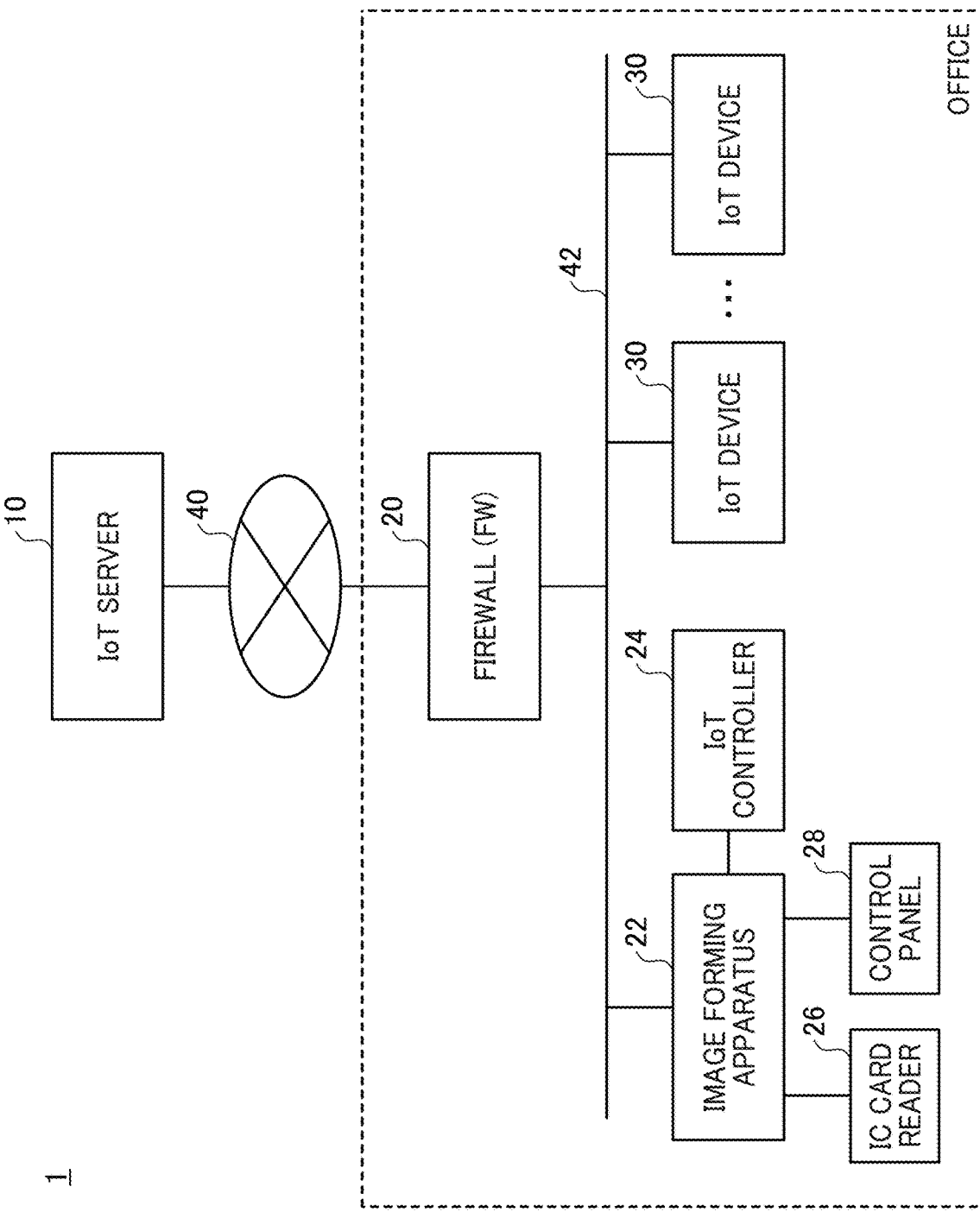
FIG. 1 is a schematic view illustrating an example configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure with reference drawings.

[First Embodiment]

<System Configuration>

FIG. 1 is a schematic view illustrating an example configuration of an information processing system 1 according to a first embodiment. In an example of FIG. 1, the information processing system 1 includes one or more IoT (Internet of Things) devices 30 provided in an office. An image forming apparatus 22 of FIG. 1 is an example of an IoT device. An IoT controller 24, an integrated circuit (IC) card reader 26 and a control panel 28 are connected to the image forming apparatus 22.

The image forming apparatus 22 and the IoT devices 30 are connected to one another through an IoT network 42 such as a local area network (LAN). The IoT network 42 is connected to an IoT server 10 via a firewall 20 and a network 40 such as the Internet.

The IoT server 10 provides the IoT controller 24 with policy data and control flow data, described later. In addition, the IoT server 10 stores report data transmitted from the IoT controller 24 as described later. The image forming apparatus 22 is an example of an electronic apparatus that is highly likely to be installed in an office.

The image forming apparatus 22 may be a laser printer, a multifunction peripheral (multifunction printer), a projector, an electronic whiteboard, a videoconference apparatus, industrial or home equipment having a communication capability, and medical equipment having a communication capability.

The image forming apparatus 22 is capable of authenticating a user by using the IC card reader 26. Further, the image forming apparatus 22 is capable of displaying information to a user and accepting an instruction from a user, by using the control panel 28.

The IoT controller 24 communicates with the IoT server 10 and the IoT device 30 using the communication capability of the image forming apparatus 22. When the IoT controller 24 itself has a communication capability, such as when the IoT controller 24 includes a wireless communication module, the IoT controller 24 may communicate with the IoT server 10 and the IoT device 30 using its own communication capability. The IoT controller 24 may be provided in the form of an expansion board built in the image forming apparatus 22 or externally attached to the image forming apparatus 22. Alternatively, the IoT controller 24 may be in the form of a housing installed near the image forming apparatus 22.

The IoT controller 24 stores the policy data and the control flow data described later, which are provided from the IoT server 10. The control flow data provided from the IoT server 10 is data for collectively managing control of the IoT devices 30 throughout an entire organization such as a company.

In addition, the IoT controller 24 stores control flow data that is generated in the image forming apparatus 22 as described later. The control flow data generated in the image forming apparatus 22 is data for individually managing control of the IoT devices 30 on a group-by-group basis, for example, which is contained in the entire organization. The group is a concept indicating a unit constituting a part of the organization. The unit constituting a part of the organization may be indicated by a physical place such as an office or may be indicated by a relationship between organizations such as a department or division.

The IoT controller 24 executes a control flow selected by a user, to control operation by the IoT device 30. For example, in response to receiving IoT devic0e data from the IoT device 30, the IoT controller 24 determines whether the IoT device data meets conditions of the control flow being executed, and controls the IoT device 30 according to the control flow whose conditions are satisfied. It should be noted that the control flow being executed means that the control flow is effective (effective control flow). Thus, the IoT controller 24 is capable of controlling the IoT devices 30 that are located in the same office, as the IoT devices 30 belonging to a specific group, by the control flow.

The information processing system 1 may be applied to various devices that are connectable via the IoT network 42, in addition to the image forming apparatus 22. For the sake of explanatory convenience of the embodiments of the present disclosure, each of these devices is referred to, but not limited to, as an "IoT device".

The "IoT device" in the present embodiment refers to a device connected to a network to implement the Internet of things (IoT). An IoT device is a device such as an electronic device and a sensor that includes a communication interface to which an address is designated, to enable the IoT device to communicate with other devices or servers using a network. In the present embodiment, examples of the IoT device include, but not limited to, a personal computer (PC), a mobile device such as a smartphone and a tablet, a wearable device, an air conditioner, a lighting device, an image forming apparatus such as a multifunction peripheral and a printer, a scanner, an electronic whiteboard, a projector, a sensor such as a temperature sensor and an acceleration sensor, a camera, a television, and a videoconference apparatus. In addition to the above, the IoT device includes various devices such as a refrigerator and a vending machine.

The mobile device as an example of the IoT device is a portable communication terminal such as a smartphone or a tablet that is communicable with the image forming apparatus 22 via a near-distance wireless communication network, for example.

The smartphone is typically a terminal that has multiple functions such as an imaging function implemented by a camera, or a function of displaying web information like a PC, in addition to a calling function as a mobile phone. The tablet is typically a tablet terminal that functions as a multifunction terminal in the same way as the smartphone does. The wearable device is typically a head-mounted device such as a smartglass, a device worn around a wrist such as a watch, a device worn on a chest such a neck strap. However, these are just examples, and alternatively, the wearable device may be attachable to an object that a user is carrying with him/her, such as a hat, a school bag, or a bag. In other words, in the present embodiment, "portable" includes both cases of being worn directly on a user's body and being worn indirectly on a user's body. The wearable device may be kept in a pocket of clothes or the like, or may be worn on a predetermined place (head, wrist, chest, etc.). Further, the wearable device may be held in a hand.

The IoT device 30 is a device such as an air conditioner, a lighting device, a multifunction peripheral, an electronic whiteboard, a projector, and a temperature sensor, provided in an office. The IoT device 30 performs registration to the IoT controller 24, and transmits IoT device data to the IoT controller 24. For example, in a case in which the IoT device 30 is a temperature sensor, the IoT device data is an output (temperature data) of the temperature sensor. In addition, in a case in which the IoT device 30 is an air conditioner, for example, the IoT device data includes ON/OFF of the power of the air conditioner and/or a temperature setting.

The control panel 28 is implemented by a computer such as a tablet PC. Further, the control panel 28 is installed with an application having a screen displaying function, such as a web browser. The web browser is just an example of the application, and any other suitable application may be used provided that it has a function of displaying a control flow creation screen that enables creation of control flow data.

It should be noted that the configuration of the information processing system 1 illustrated in FIG. 1 is just an example, and one or more server apparatuses such as a proxy server and a gateway server may be interposed between the firewall 20 and the IoT server 10.

The IoT device 30 includes the image forming apparatus 22 including or provided with the IoT controller 24. The image forming apparatus 22 including or provided with the IoT controller 24 is referred to hereinafter as the "image forming apparatus 22 including the IoT controller 24" in order to simplify the description. In each IoT device 30, an IP address of the IoT server 10 (or the IoT device 30 including the IoT controller 24) and a port number corresponding to a communication interface are set, to implement coordination with the IoT server 10 (or with the other IoT devices 30).

Each IoT device 30 polls the IP address and port number via a communication interface periodically for example in order to inquire about the occurrence of any event. The inquiry includes, for example, identification information for identifying a communication destination such as a serial number. In a case in which the serial number designated in the inquiry is stored in the IoT server 10, for example, the communication interface of the IoT server 10 transmits various data such as the policy data to the IoT device 30 corresponding to the serial number.

It should be noted that the serial number is just an example of identification information for identifying a communication destination. Any other suitable information may be used provided that the communication destination can be identified. The identification information for identifying a communication destination includes address information capable of identifying the IoT device 30 on the network and identification information assigned to the IoT device 30 by a service provider or an administrator.

In addition, the identification information for identifying a communication destination may be information changeable by the service provider or the administrator. For example, the identification information for identifying a communication destination stored in the IoT device 30 may be changeable through a direct operation to the IoT device 30 or an operation from a terminal that accesses the IoT device 30 via the network. Further, the identification information for identifying a communication destination may be stored in a storage medium 503a such as a subscriber identifier module (SIM) card, from or to which the IoT device 30 reads out or write data via an interface. The identification information for identifying a communication destination assigned to the IoT device 30 may be changed by changing such storage medium.

Further, the IoT server 10 may manage the identification information such that the IoT device 30 having the IoT controller 24 and the IoT device 30 not having the IoT controller 24 are distinguishable from each other. For example, the IoT server 10 may store the identification information of the IoT device 30 having the IoT controller 24 and the identification information of the IoT device 30 not having the IoT controller 24 in separate tables. Further, the IoT server 10 may store the identification information of each IoT device in association with flag information indicating whether or not the IoT device 30 has the IoT controller 24. Furthermore, the IoT server 10 may change a way of assigning the identification information depending on whether or not the IoT device 30 has the IoT controller 24.

In this case, the IoT server 10 may transmit various data such as the policy data only to the IoT device 30 including the IoT controller 24. Further, only the IoT device 30 including the IoT controller 24 may request various data such as the policy data from the IoT server 10. A detailed description is given later of a process by the IoT controller 24 of obtaining various data such as policy data from the IoT server 10, with reference to FIG. 9. Although, in the above, a description is given of communication between the IoT server 10 and the IoT device 30, communication between the IoT device 30 including the IoT controller 24 and the other IoT devices 30 not including the IoT controller 24 may be performed in substantially the same manner. More specifically, the other IoT devices 30 not including the IoT controller 24 are able to poll the registered IoT controller 24.

In a case in which no firewall 20 is interposed between the office as an example of a user environment and the IoT server 10 as an example of an external environment, the communication interface of the IoT server 10 may transmit various data such as the policy data to each IoT device 30. In this case, device information stored in a policy data storage 55 may include an IP address, a port number, etc., of the IoT device 30. The same applies to the communication between the IoT controller 24 and the IoT device 30 registered in the IoT controller 24.

Figure 16:
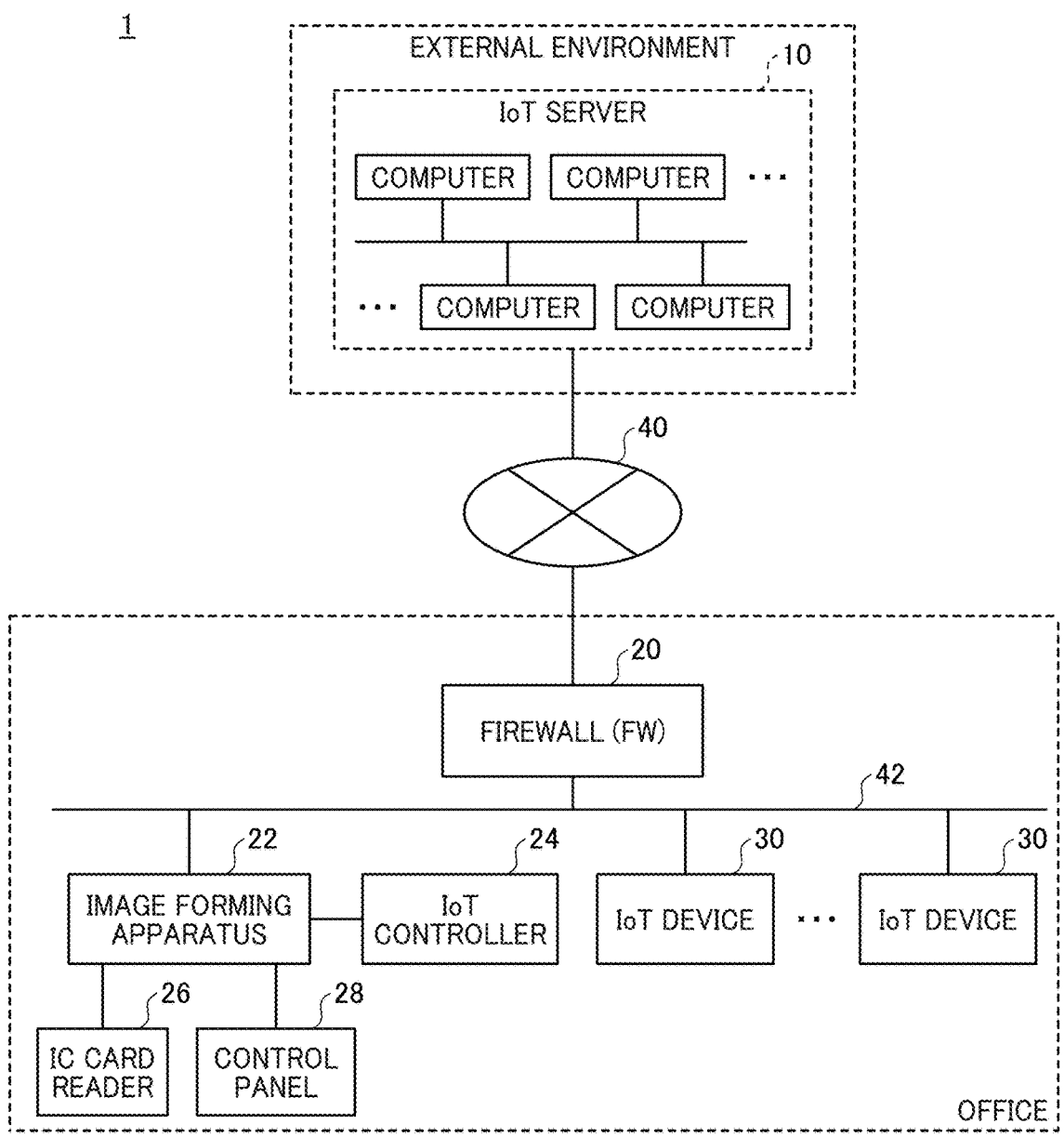
FIG. 16 is a schematic view illustrating another example configuration of the information processing system according to an embodiment of the present disclosure.

In addition, the IoT server 10 may be implemented by a distributed plurality of computers, as illustrated in FIG. 16. FIG. 16 is a schematic view illustrating another example configuration of the information processing system 1 according to the present embodiment. In FIG. 16, a plurality of computers cooperate to implement the IoT server 10 in the external environment.

Further, a part of functions of the IoT server 10 may be included in one or more other servers. In addition, the IoT devices 30 installed in the same office as illustrated in FIG. 1 is just an example, and the IoT devices 30 may be the IoT devices 30 installed on the same floor of a building or installed in the same room.

<Hardware Configuration>
<<Computer>>

Figure 2:
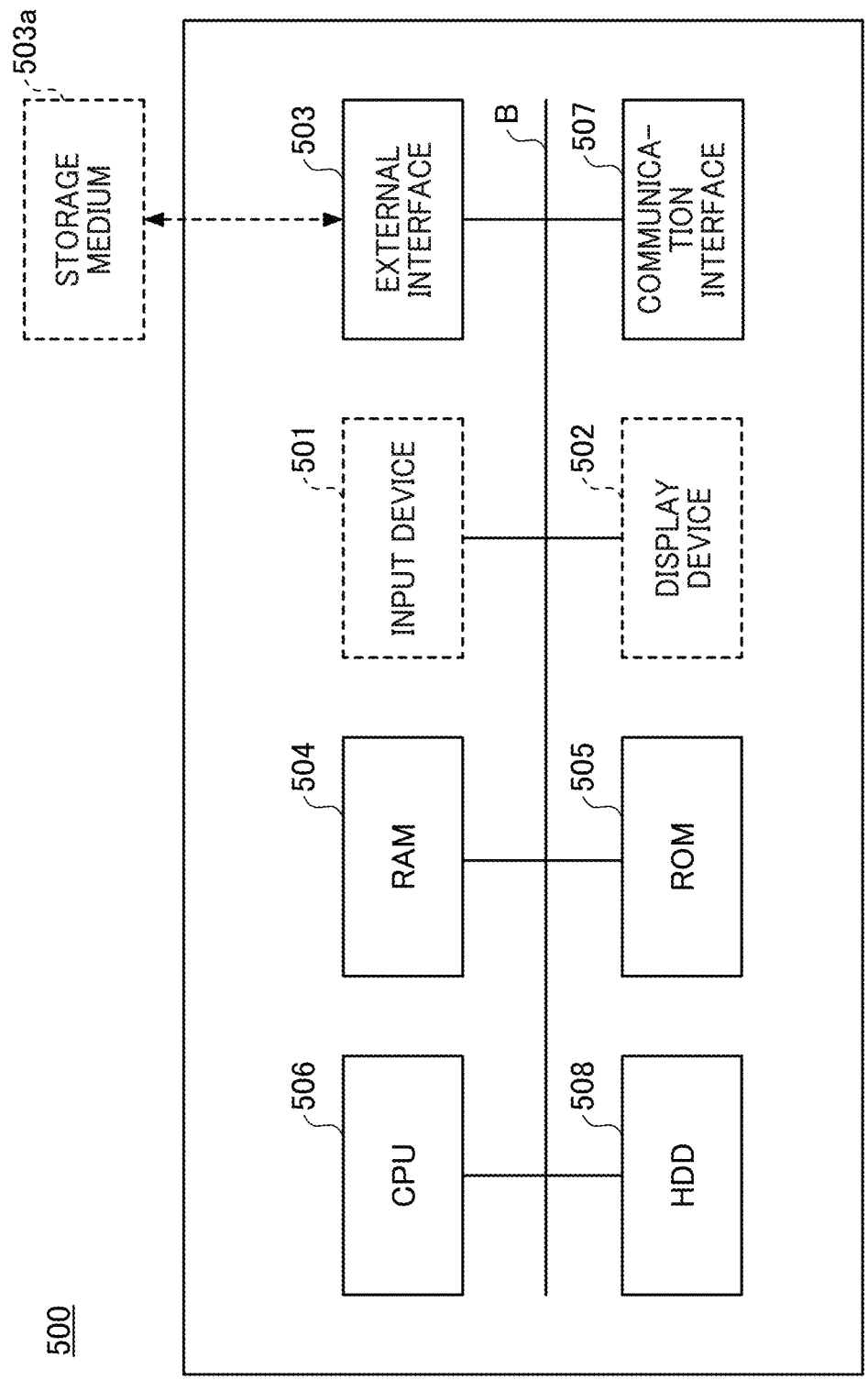
FIG. 2 is a block diagram illustrating an example hardware configuration of a computer according to an embodiment of the present disclosure.

Each of the IoT server 10 and the control panel 28 of FIG. 1 is implemented by a computer having a hardware configuration as illustrated in FIG. 2. FIG. 2 is a block diagram illustrating an example hardware configuration of the computer 500.

As illustrated in FIG. 2, the computer 500 includes an input device 501, a display device 502, an external interface 503, a random access memory (RAM) 504, a read only memory (ROM) 505, a central processing unit (CPU) 506, a communication interface 507, and a hard disc drive (HDD) 508, which are connected to one another via a bus B. It should be noted that the input device 501 and the display device 502 are not necessarily constantly connected to the bus B. In other words, the input device 501 and the display device 502 could be connected to the bus B as necessary when used.

The input device 501 includes a keyboard, a mouse, and/or a touch panel enabling a user to input various operation signals. The display device 502 includes a display on which results of processes by the computer 500 are displayed.

The communication interface 507 is an interface device to connect the computer 500 to various networks. The computer 500 communicates data via the communication interface 507.

The HDD 508 is an example of a nonvolatile storage device that stores programs or data therein. Examples of the programs or data stored in the HDD 508 include an operating system (OS) for controlling an entire operation of the computer 500 and application software providing various functions on the OS. The computer 500 may include, instead of or in addition to the HDD 508, a drive device such as a solid state drive (SSD) that uses a flash memory as a storage medium.

The external interface 503 is an interface device with an external device. Examples of the external device include the storage medium 503*a*. The external interface 503 enables the computer 500 to read or write data from or to the storage medium 503*a*. Examples of the storage medium 503*a* include a flexible disc, a compact disc (CD), a digital versatile disc (DVD), a SD memory card, a universal serial bus (USB) memory, and a SIM card.

The ROM 505 is an example of a nonvolatile semiconductor memory (storage device), which holds programs or data even after the computer 500 is turned off as the power is not supplied. The ROM 505 stores programs and data such as a basic input output system (BIOS), which is executed when the computer 500 starts up, OS settings, and network settings. The RAM 504 is an example of a volatile semiconductor memory (storage device), which holds programs or data temporarily.

The CPU 506 reads programs or data from a storage device such as the ROM 505 and the HDD 508 onto the RAM 504, and executes processes to implement the entire control of the computer 500 or functions of the computer 500. The CPU 506 may be implemented by one processor or a plurality of processors.

The IoT server 10 and the control panel 28 implement processes as described later with the hardware configuration of the computer 500 illustrated in FIG. 2, for example.

<<Image Forming Apparatus>>

Figure 3:
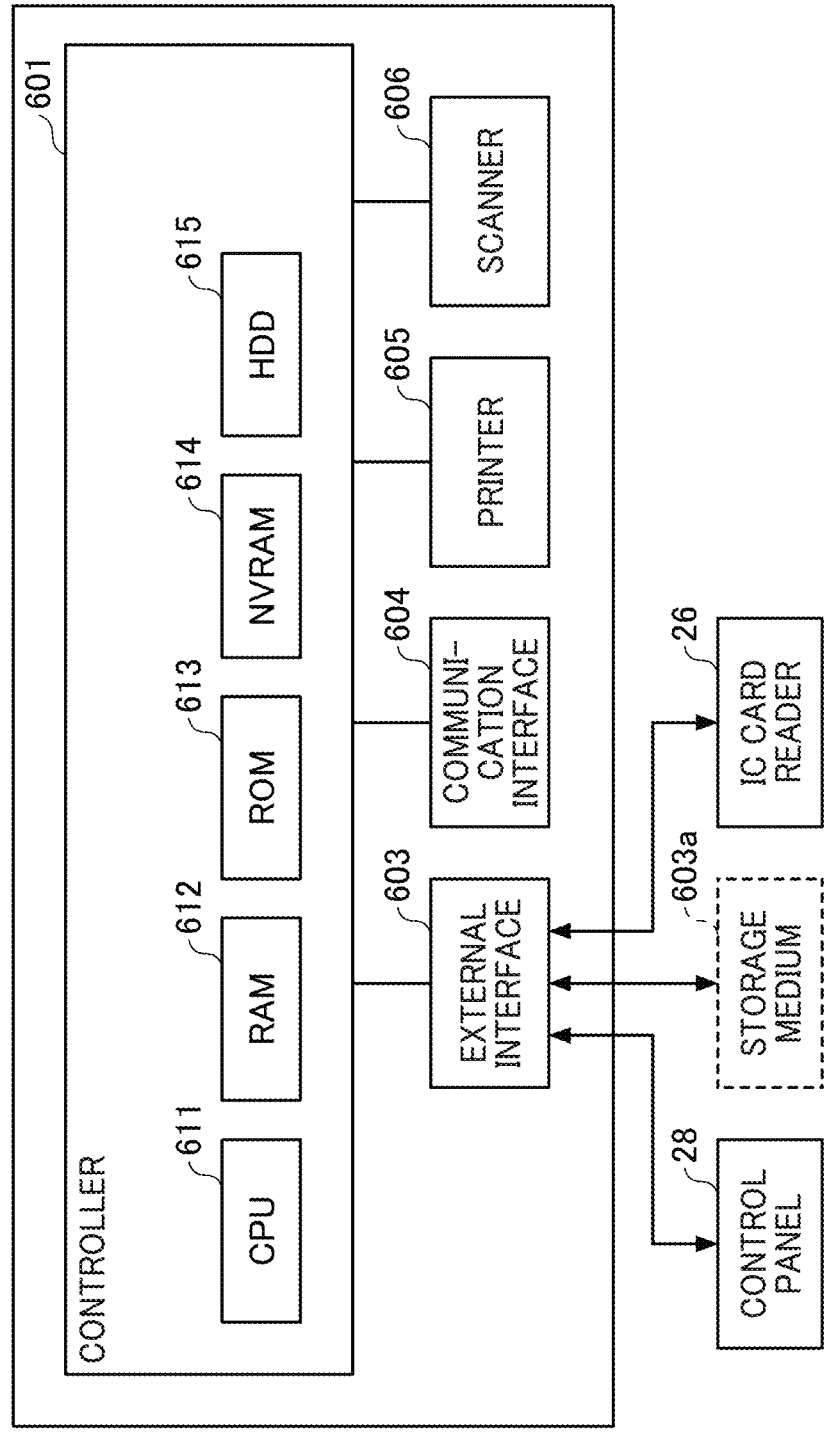
FIG. 3 is a block diagram illustrating an example hardware configuration of an image forming apparatus according to an embodiment of the present disclosure.

The image forming apparatus 22 of FIG. 1 is implemented by a hardware configuration as illustrated in FIG. 3, for example, in a case in which the image forming apparatus 22 is a multifunction peripheral. FIG. 3 is a block diagram illustrating an example hardware configuration of the image forming apparatus 22. As illustrated in FIG. 3, the image forming apparatus 22 includes a controller 601, an external interface 603, a communication interface 604, a printer 605, and a scanner 606.

The controller 601 includes a CPU 611, a RAM 612, a ROM 613, a non-volatile random access memory (NVRAM) 614, and an HDD 615. The ROM 613 stores various programs and data. The RAM 612 stores programs and data temporarily. The NVRAM 614 stores setting information, etc., for example. The HDD 615 stores various programs and data.

The CPU 611 performs processes according to the programs, data, setting information, etc., read from the ROM 613, the NVRAM 614, the HDD 615, etc., onto the RAM 612 to control an entire operation of the image forming apparatus 22 and implement functions of the image forming apparatus 22.

The external interface 603 is an interface device with an external device. Examples of the external device include the IoT controller 24, the IC card reader 26, the control panel 28, and a storage medium 603*a*. The image forming apparatus 22 communicates with the IoT controller 24, the IC card reader 26, and the control panel 28 via the external interface 603. The control panel 28 includes an input device that accepts inputs from a user, and a display device that displays various types of information.

The external interface 603 further enables the image forming apparatus 22 to read or write data from or to the storage medium 603*a*. Examples of the storage medium 603*a* include an IC card, a flexible disc, a CD, a DVD, a SD memory card, a USB memory, and a SIM card.

The communication interface 604 is an interface device to connect the image forming apparatus 22 to the IoT network 42. The image forming apparatus 22 communicates data via the communication interface 604.

The printer 605 is a printing device that forms an image on a conveyed medium in accordance with print data. Examples of the conveyed medium include paper, coated paper, thick paper, overhead projector (OHP) transparencies, plastic films, pre-preg, and copper foil. The scanner 606 is a reading device that scans a document to obtain image data (electronic data). FIG. 3 illustrates a hardware configuration of a multifunction peripheral as an example of the image forming apparatus 22. In a case in which the image forming apparatus 22 is a device or apparatus other than a multifunction peripheral, the printer 605 and/or the scanner 606 may be omitted. Further, the image forming apparatus 22 may include hardware components other than those illustrated in FIG. 3, such as a camera or a lamp light source.

<<IoT Controller>>

Figure 4:
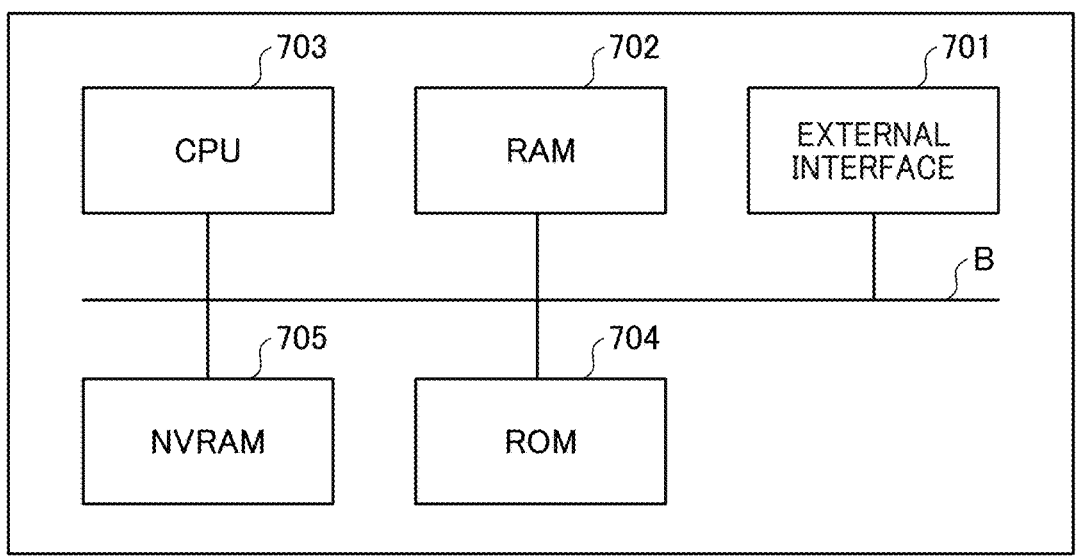
FIG. 4 is a block diagram illustrating an example hardware configuration of an IoT controller according to an embodiment of the present disclosure.

The IoT controller 24 of FIG. 1 is implemented by, for example, a computer having a hardware configuration as illustrated in FIG. 4. FIG. 4 is a block diagram illustrating an example hardware configuration of the IoT controller 24.

As illustrated in FIG. 4, the IoT controller 24 includes an external interface 701, a RAM 702, a CPU 703, a ROM 704, and an NVRAM 705, which are connected to one another via a bus B. The NVRAM 705 is an example of a nonvolatile storage device that stores programs or data therein.

The external interface 701 is an interface device with an external device. Examples of the external device include the image forming apparatus 22 and a storage medium. The external interface 701 enables the IoT controller 24 to read or write data from or to a storage medium such as a flexible disc, a CD, a DVD, a SD memory card, a USB memory, and a SIM card.

The ROM 704 is an example of a nonvolatile semiconductor memory (storage device), which holds programs or data even after the IoT controller 24 is turned off as the power is not supplied. The ROM 704 stores programs or data executed when the IoT controller 24 is started up. The RAM 702 is an example of a volatile semiconductor memory (storage device), which holds programs or data temporarily. The CPU 703 reads programs or data from a storage device such as the ROM 704 and the NVRAM 705 onto the RAM 702, and executes processes to implement the entire control of the IoT controller 24 or functions of the IoT controller 24. The CPU 703 may be implemented by one processor or a plurality of processors. The IoT controller 24 implements various processes as described later with the hardware configuration as illustrated in FIG. 4, for example.

<Software Configuration>

A description is given hereinafter of a software configuration of the information processing system 1 according to the present embodiment. A description of elements or processes that are not relevant to the present embodiment is omitted below as appropriate.

<<IoT Server>>

Figure 5:
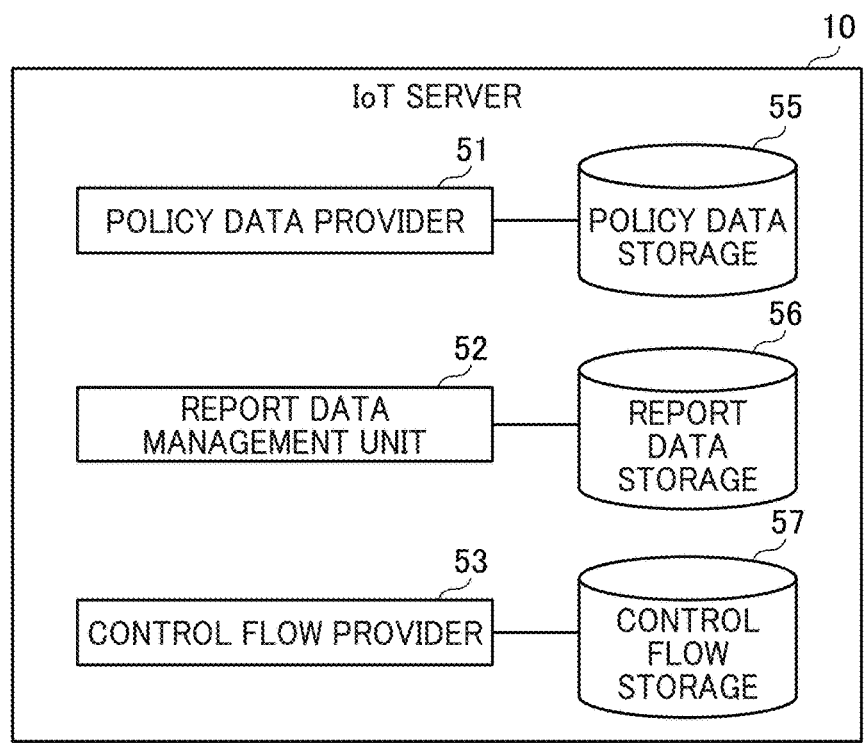
FIG. 5 is a block diagram illustrating a functional configuration of an IoT server according to an embodiment of the present disclosure.

The IoT server 10 according to the present embodiment is implemented by processing blocks as illustrated in FIG. 5, for example. FIG. 5 is a block diagram illustrating a functional configuration of the IoT server 10 according to the present embodiment.

The IoT server 10 of FIG. 5 implements a policy data provider 51, a report data management unit 52, a control flow provider 53, a policy data storage 55, a report data storage 56, and a control flow storage 57 by executing a program.

The policy data provider 51 provides the IoT controller 24 with policy data described later. The policy data is stored in the policy data storage 55. The policy data stored in the policy data storage 55 is used for determining whether or not a user is permitted to execute a control flow described later.

The report data management unit 52 receives report data from the IoT controller 24, and stores the received report data in the report data storage 56. The control flow provider 53 provides the IoT controller 24 with control flow data described later. The control flow data is stored in the control flow storage 57. The control flow data stored in the control flow storage 57 is data for collectively managing control of the IoT devices 30 throughout an entire organization such as a company.

<<Control Panel and Image Forming Apparatus>>

Figure 6:
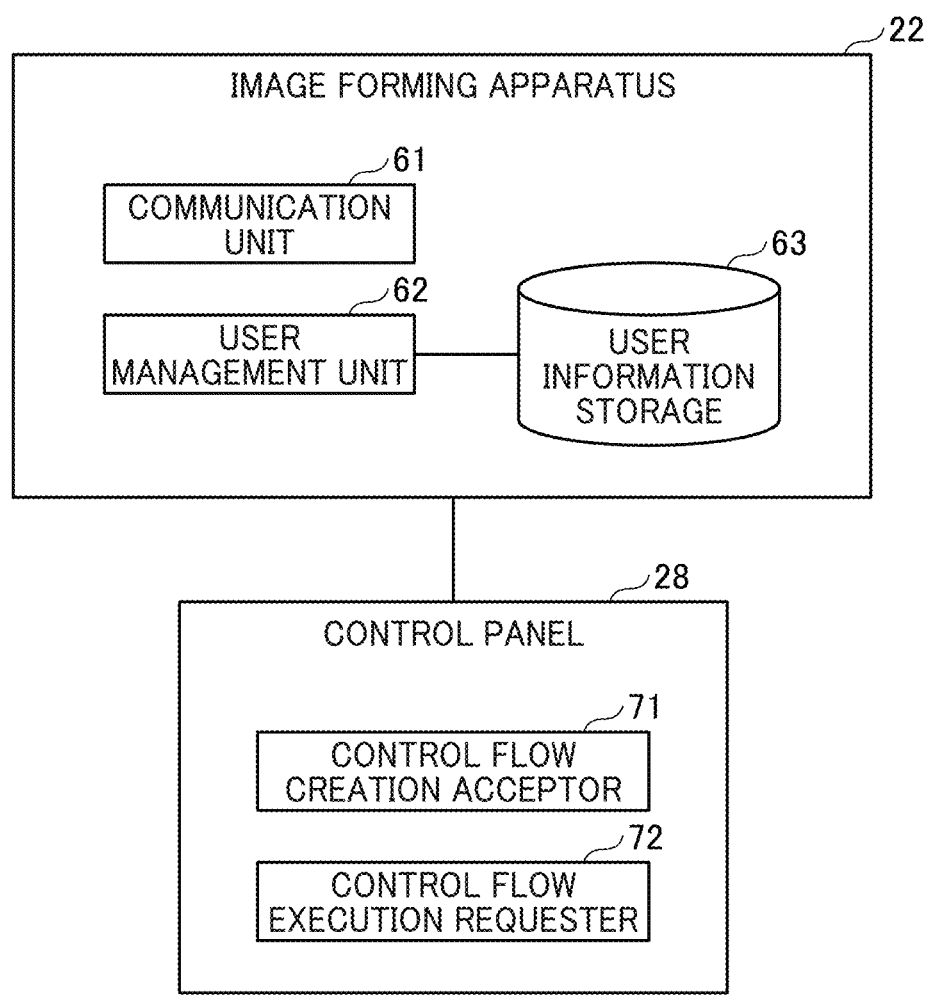
FIG. 6 is a block diagram illustrating a functional configuration of a control panel and the image forming apparatus according to an embodiment of the present disclosure.

Each of the control panel 28 and the image forming apparatus 22 according to the present embodiment is implemented by processing blocks as illustrated in FIG. 6, for example. FIG. 6 is a block diagram illustrating a functional configuration of the control panel 28 and the image forming apparatus 22 according to the present embodiment.

The image forming apparatus 22 of FIG. 6 includes a communication unit 61, a user management unit 62, and a user information storage 63. The communication unit 61 communicates data with the outside via the IoT network 42. The user management unit 62 manages information stored in the user information storage 63. For example, the user management unit 62 authenticates a user using information that is read out from a user's IC card by the IC card reader 26 and the user information stored in the user information storage 63.

The control panel 28 implements a control flow creation acceptor 71 and a control flow execution requester 72 by executing a program. The control flow creation acceptor 71 displays the control flow creation screen, for example, to accept creation of an individual control flow to the IoT device 30 in an office from a user. Further, the control flow execution requester 72 requests the IoT controller 24 to execute a control flow selected by a user.

<<IoT Controller>>

Figure 7:
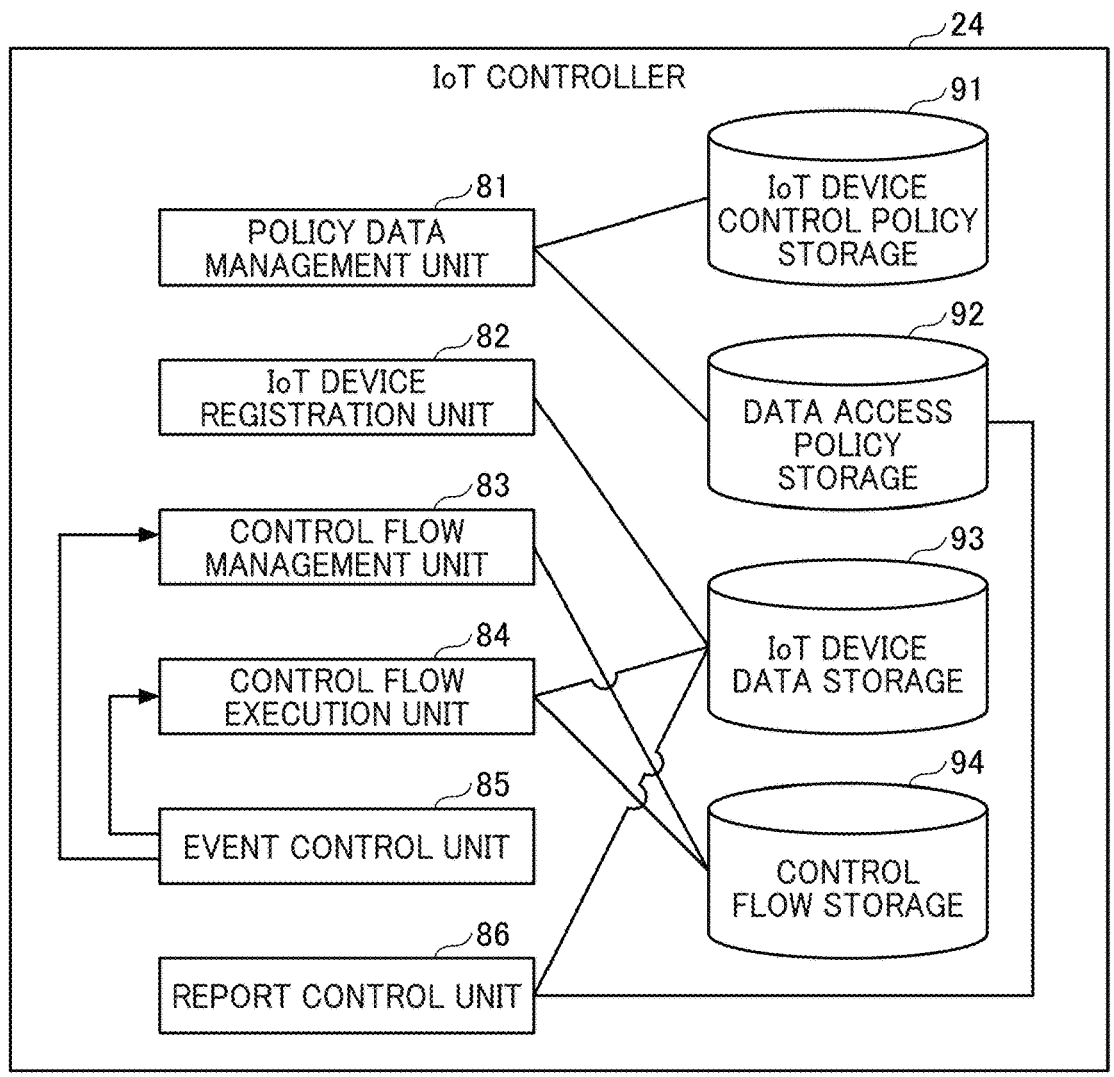
FIG. 7 is a block diagram illustrating a functional configuration of the IoT controller according to according to an embodiment of the present disclosure.

The IoT controller 24 according to the present embodiment is implemented by processing blocks as illustrated in FIG. 7, for example. FIG. 7 is a block diagram illustrating a functional configuration of the IoT controller 24 according to the present embodiment.

The IoT controller 24 of FIG. 7 implements a policy data management unit 81, an IoT device registration unit 82, a control flow management unit 83, a control flow execution unit 84, an event control unit 85, and a report control unit 86, by executing a program. Further, the IoT controller 24 implements an IoT device control policy storage 91, a data access policy storage 92, an IoT device data storage 93, and a control flow storage 94.

The policy data management unit 81 stores an IoT device control policy included in the policy data provided from the IoT server 10 in the IoT device control policy storage 91, and manages the stored control policy. Further, the policy data management unit 81 stores a data access policy included in the policy data provided from the IoT server 10 in the data access policy storage 92, and manages the stored access policy.

It should be noted that the larger the number of IoT devices 30 to be handled, the larger the amount of the policy data. To address this issue, the policy data management unit 81 performs an update process of deleting the policy data that is no more required, to save a memory capacity. The policy data may be deleted in the following ways.

As one way of deleting the policy data, once the IoT controller 24 receives, from the IoT server 10, information identifying given policy data and a notification indicating that the given policy data is not more required, the policy data management unit 81 deletes the given policy data. Before deleting the policy data, the policy data management unit 81 may transmit log information including information indicating which policy data is to be deleted and a serial number of the IoT controller 24 itself to the IoT server 10. This enables the IoT server 10 to recognize which IoT controller 24 stores which policy data.

As another way of deleting the policy data, policy data item is provided with an expiration in advance, and the IoT controller 24 determines whether or not a target policy data has been expired. When the determination result indicates that the target policy data has been expired, the policy data management unit 81 deletes the policy data, in substantially the same manner as the above way. In the similar manner to the above, the policy data management unit 81 may transmit the log information to the IoT server 10 before deleting the policy data.

In another example, the policy data management unit 81 determines whether the IoT device 30 related to the policy data received from the IoT server 10 is registered in the IoT device data storage 93 of the IoT controller 24. When the determination result indicates that the IoT device 30 is not registered, the policy data management unit 81 may notify the IoT server 10 that the IoT device 30 is not registered, and delete the policy data.

In this case, when the IoT device 30 is newly registered in the IoT device data storage 93, the policy data management unit 81 inquires of the IoT server 10 about whether policy data that is not stored in the IoT controller 24 and relates to the newly registered IoT device 30 is stored in the IoT server 10, from the image forming apparatus 22.

When the IoT server 10 determines that the policy data that matches the inquired condition is stored in the IoT server 10, the IoT server 10 transmits the corresponding policy data to the image forming apparatus 22 to enable the IoT controller 24 to update the policy data stored therein. A detailed description is given later of a process of newly registering the IoT device 30, with reference to FIG. 11.

The IoT device registration unit 82 registers the IoT devices 30 located in the same office in the IoT device data storage 93, as the IoT devices 30 belonging to a specific group. In the IoT device data storage 93, the IoT device data of the IoT devices 30 belonging to the specific group is stored.

The control flow management unit 83 stores the control flow data provided from the IoT server 10 in the control flow storage 94, and manages the stored control flow data. Further, the control flow management unit 83 stores data of the control flow created by a user on the control panel 28 as control flow data in the control flow storage 94, and manages the stored control flow data.

The control flow execution unit 84 performs processes relating to execution of the control flow. In a case in which a user who requested execution of a given control flow is not prohibited for a process of the given control flow, the control flow execution unit 84 starts execution of the requested control flow. The event control unit 85 detects events including a request for execution of a control flow from the control panel 28, the reception of IoT device data from the IoT device 30, the reading-out of information from an IC card. Further, the event control unit 85 notifies the control flow management unit 83 and the control flow execution unit 84 of the detected events.

The report control unit 86 transmits the IoT device data stored in the IoT device data storage 93 as report data to the IoT server 10 according to the data access policy stored in the data access policy storage 92.

<<IoT Device>>

Figure 8:
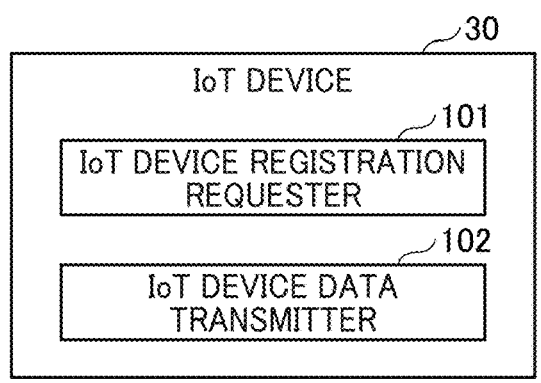
FIG. 8 is a block diagram illustrating a functional configuration of an IoT device according to an embodiment of the present disclosure.

The IoT device 30 according to the present embodiment is implemented by processing blocks as illustrated in FIG. 8, for example. FIG. 8 is a block diagram illustrating a functional configuration of the IoT device 30 according to the present embodiment.

The IoT device 30 of FIG. 8 includes an IoT device registration requester 101 and an IoT device data transmitter 102. The IoT device registration requester 101 requests the IoT controller 24 to register the IoT device 30 itself in the IoT controller 24. The IoT device data transmitter 102 transmits IoT device data to the IoT controller 24 that registered the IoT device 30 according to the request from the IoT device registration requester 101.

<Operation>

<<IoT Device Control>>

Figure 9:
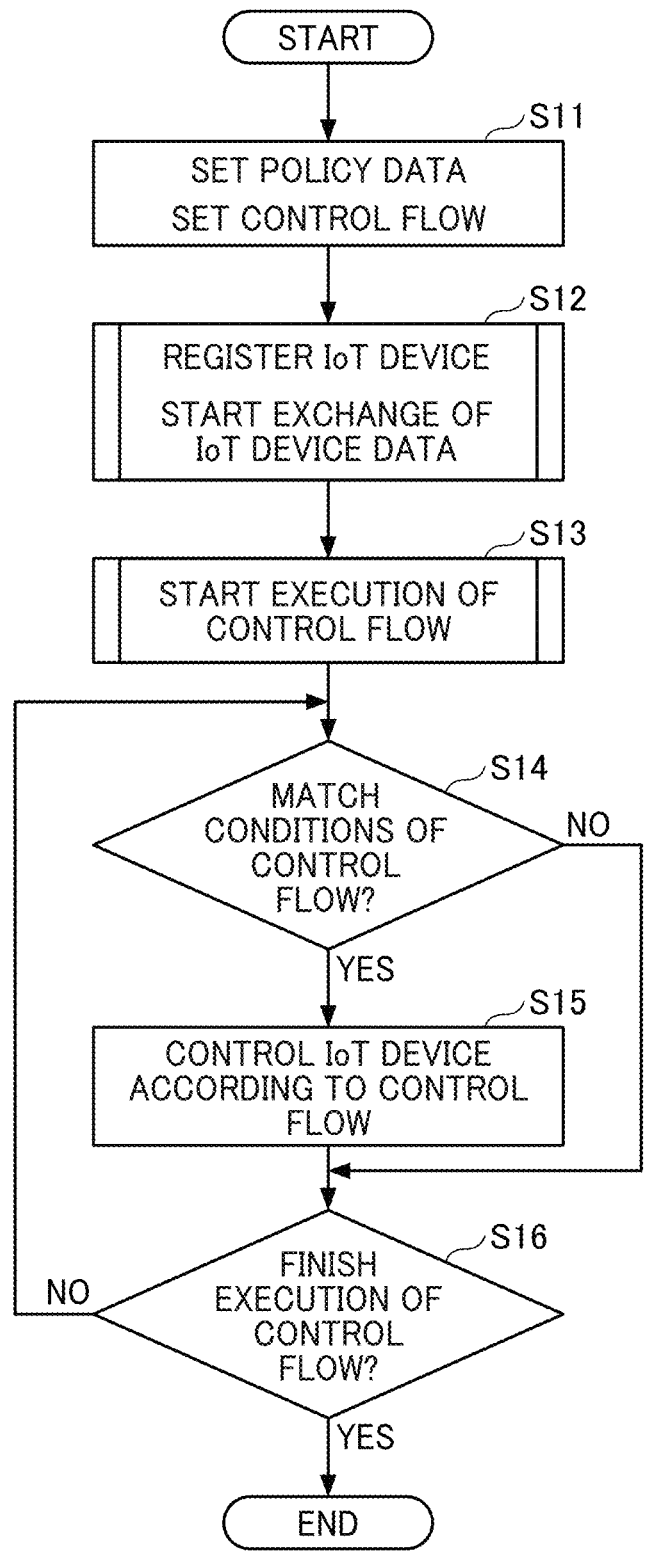
FIG. 9 is a flowchart illustrating an operation of controlling IoT devices according to according to an embodiment of the present disclosure.

The information processing system 1 according to the present embodiment performs an operation for controlling the IoT devices 30 as illustrated in FIG. 9. FIG. 9 is a flowchart illustrating an operation of controlling the IoT devices 30 according to the present embodiment.

At S11, the policy data management unit 81 of the IoT controller 24 accesses the policy data provider 51 of the IoT server 10. The policy data management unit 81 designates identification information (ID) of an organization such as a company or a building that collectively manages control of the IoT devices 30, to receive policy data associated with the ID from the policy data provider 51. It should be noted that the IoT server 10 may store the policy data of an organization in association with the identification information of the IoT controller 24 instead of the organization's identification information (ID). In this case, the IoT server 10 may receive the identification information of the IoT controller 24 and obtain the policy data associated with the received identification information. Accordingly, the policy data provider 51 provides the obtained policy data to the IoT controller 24. In addition, the IoT server 10 may store the identification information (ID) of an organization in association with the identification information of the IoT controller 24. In this case, the IoT server 10 identifies the identification information (ID) of organization based on the received identification information of the IoT controller 24. The IoT server 10 obtains policy data based on the identified identification information (ID) of organization, and provides the obtained policy data to the IoT controller 24.

The policy data management unit 81 sets the IoT device control policy and the data access policy included in the received policy data. Specifically, the policy data management unit 81 stores the IoT device control policy in the IoT device control policy storage 91 to set the IoT device control policy. In addition, the policy data management unit 81 stores the data access policy in the data access policy storage 92 to set the data access policy.

Further, the control flow management unit 83 of the IoT controller 24 accesses the control flow provider 53 of the IoT server 10. The control flow management unit 83 designates identification information (ID) of an organization such as a company or a building that collectively manages control of the IoT devices 30, to receive control flow data associated with the ID from the control flow provider 53. The control flow management unit 83 stores the received control flow data in the control flow storage 94 to perform setting.

In the similar manner to the policy data, the IoT server 10 may store the control flow data of an organization in association with the identification information of IoT controller 24 instead of the organization's identification information (ID). In this case, the IoT server 10 may receive the identification information of the IoT controller 24 and obtain the control flow data associated with the received identification information. Accordingly, the control flow provider 53 provides the obtained control flow data to the IoT controller 24. In addition, the IoT server 10 may store the identification information (ID) of an organization in association with the identification information of the IoT controller 24. In this case, the IoT server 10 identifies the identification information (ID) of organization based on the received identification information of the IoT controller 24. Accordingly, the IoT server 10 obtains control flow data based on the identified identification information (ID) of organization, and provides the obtained control flow data to the IoT controller 24.

With the process of S11, the IoT controller 24 is able to obtain the policy data and the control flow data associated with an organization that collectively manages control of the IoT devices 30 from the IoT server 10, and set the obtained data.

At S12, the IoT device registration unit 82 of the IoT controller 24 searches for the IoT devices 30 installed in the same office. The IoT device registration requester 101 of the searched IoT devices 30 requests the IoT device registration unit 82 of the IoT controller 24 to register the IoT device 30 itself. The IoT device registration unit 82 registers the IoT devices from which the request for IoT device registration is received in the IoT device data storage 93 as the IoT devices 30 belonging to a specific group.

In addition, the IoT device data transmitter 102 of the IoT devices 30 that sent the request for IoT device registration starts transmission of IoT device data to the IoT controller 24 that registered the IoT devices 30. The event control unit 85 stores the IoT device data received from the IoT devices 30 in the IoT device data storage 93.

At S13, the control flow execution unit 84 of the IoT controller 24 receives selection of a control flow to be executed from a user operating the image forming apparatus 22. The control flow execution unit 84 refers to the IoT device control policy to determine whether the user who selected the control flow is a user to whom a process of the control flow is permitted.

Figures 10, 11:
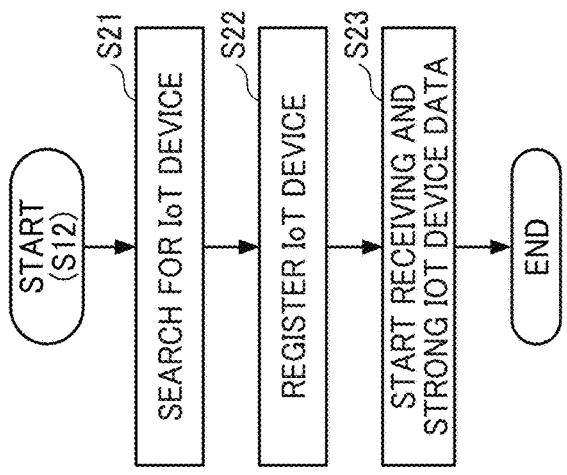
FIG. 10 is an illustration of an example of a control flow according to an embodiment of the present disclosure.
FIG. 11 is a flowchart illustrating an example of detailed processes performed at S12 of the flowchart of FIG. 9.

In a case in which the process of the selected control flow is permitted to the user who selected the control flow, the control flow execution unit 84 starts execution of the control flow as illustrated in FIG. 10, for example. FIG. 10 illustrates an example of the control flow. The control flow in FIG. 10 has a control flow name, conditions, and processes as items. The control flow name is an example of identification information that enables a user to identify a control flow. The processes are various processes for controlling the IoT device 30. The conditions are various conditions for performing the processes of a control flow.

For example, the control flow of FIG. 10 is a control flow for controlling an air conditioner, which is an example of the IoT device 30. The control flow of FIG. 10 indicates that when a condition of "8 o'clock to 20 o'clock on weekdays" and a condition of "temperature sensor, 28° C. or higher" are both satisfied, the processes of "turning on the air conditioner" and "setting a temperature to 25° C." are to be performed. Further, the control flow of FIG. 10 indicates that when a condition of "8 o'clock to 20 o'clock on weekdays" and a condition of "temperature sensor, 22° C. or lower" are both satisfied, the processes of "turning on the air conditioner" and "setting a temperature to 25° C." are to be performed.

Once the execution of control flow is started, the control flow execution unit 84 repeats the processes from S14 to S16 to detect a control flow that matches the conditions, until a user instructs the end of execution of the control flow. In a case in which a control flow that matches the conditions is detected, an operation proceeds to S15. At S15, the control flow execution unit 84 controls the IoT device 30 according to the control flow that matches the conditions.

<<Processes of S12>>

FIG. 11 is a flowchart illustrating detailed processes performed at S12. At S21, the IoT device registration unit 82 of the IoT controller 24 searches for the IoT devices 30 located in the same office. For example, the IoT device registration unit 82 performs broadcasting to search for the IoT devices 30 in an office.

At S22, the IoT device registration requester 101 of each of the searched IoT devices (e.g., the IoT devices 30 that received the broadcast) requests the IoT device registration unit 82 of the IoT controller 24 to register the IoT device 30 itself. This request for the registration of IoT device contains device information of the IoT device 30 and information indicating available functions (processes).

The device information of the IoT device 30 includes the above-described identification information for identifying communication destination. The IoT devices 30 are distinguished from each other by using the identification information. Further, the device information includes address information such as an IP address for identifying the IoT device 30 on a network. Data are transmitted to the IoT device 30 by using the address information. It should be noted that the identification information for identifying a communication destination may be the address information. The IoT device registration unit 82 of the IoT controller 24 registers the device information and information of available functions of the IoT devices 30 from which the request for IoT device registration is received in the IoT device data storage 93 as the IoT devices 30 belonging to a specific group.

At S23, the IoT device data transmitter 102 of the IoT devices 30 that sent the request for IoT device registration starts transmission of IoT device data to the IoT controller 24 that registered the IoT devices 30. The event control unit 85 of the IoT controller 24 starts receiving the IoT device data from the IoT devices 30 and storing the received IoT device data in the IoT device data storage 93.

<<Processes of S13>>

Figure 12:
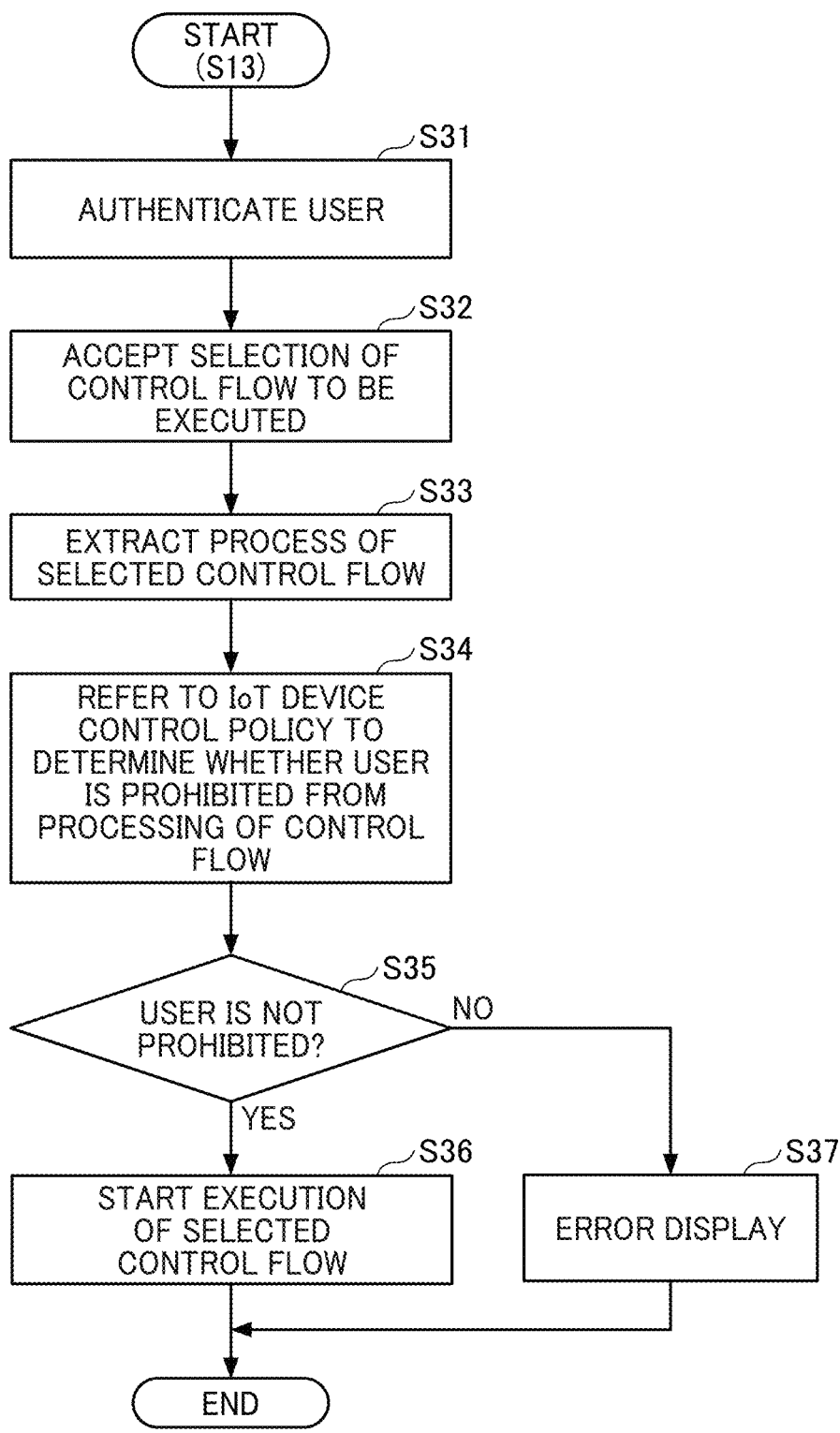
FIG. 12 is a flowchart illustrating an example of detailed processes performed at S13 of the flowchart of FIG. 9.

FIG. 12 is a flowchart illustrating an example of detailed processes performed at S13. At S31, the control flow execution unit 84 of the IoT controller 24 authenticates a user operating the control panel 28 and identifies the user information of the user operating the control panel 28. At S32, the control flow execution unit 84 accepts selection of the control flow to be executed from the user operating the image forming apparatus 22.

At S33, the control flow execution unit 84 refers to the control flow of FIG. 10 to extract processes of the control flow selected by the user. The processes of the control flow extracted at S33 are processes of the IoT device 30 required for executing the control flow selected by the user.

At S34, the control flow execution unit 84 identifies a role included in the user information of the user operating the image forming apparatus 22. Further, the control flow execution unit 84 refers to the IoT device control policy as illustrated in FIG. 13 to identify processes that are permitted and processes that are prohibited corresponding to the role of the user operating the image forming apparatus 22.

The control flow execution unit 84 compares the processes permitted and prohibited corresponding to the role of the user operating the image forming apparatus 22 with the processes of the IoT device 30 required for executing the control flow selected by the user. Based on the comparison result, the control flow execution unit 84 determines whether or not the user operating the image forming apparatus 22 is prohibited for the processes of the IoT device 30 required for executing the control flow selected by the user.

In other words, the control flow execution unit 84 determines, based on the IoT device control policy as illustrated in FIG. 13, whether the user who selected the control flow is a user to whom the processes of the selected control flow are permitted.

When the control flow execution unit 84 determines that the processes required for executing the selected control flow are permitted to the user operating the image forming apparatus 22 (S35: YES), the operation proceeds to S36. At S36, the control flow execution unit 84 starts execution of the control flow that is selected by the user at S32. When the control flow execution unit 84 determines that the processes required for executing the selected control flow are prohibited to the user operating the image forming apparatus 22 (S35: NO), the operation proceeds to S37. At S37, the control flow execution unit 84 instructs the control panel 28 to display an error message, for example.

In other words, in a case in which a user who selected a given control flow is a user to whom the processes of the selected control flow are permitted, the control flow execution unit 84 starts execution of the control flow selected by the user. By contrast, in a case in which a user who selected a given control flow is a user to whom the processes of the selected control flow are prohibited, the control flow execution unit 84 does not start execution of the control flow selected by the user.

In an example of the IoT device control policy illustrated in FIG. 13, "power on/off" and "temperature setting", which are processes of an air conditioner as the IoT devices 30, are permitted to a user whose role is an "administrative user". Further, "power on/off" and "temperature setting", which are processes of an air conditioner as the IoT device 30, are prohibited to a user whose role is a "general user".

Although in the IOT device control policy illustrated in FIG. 13, both of the users to whom the processes are permitted and prohibited are set, only a user to whom one or more processes are permitted may be set in the IOT device control policy. In another example, only a user to whom one or more processes are prohibited may be set in the IoT device control policy.

In a case in which the role of a user who selected the control flow of FIG. 10 at S32 is the "administrative user", the control flow execution unit 84 determines that the user is a user to whom "power on/off" and "temperature" are permitted. Accordingly, the control flow execution unit 84 starts execution of the control flow of FIG. 10. By contrast, in a case in which the role of a user who selected the control flow of FIG. 10 at S32 is the "general user", the control flow execution unit 84 determines that the user is a user to whom "power on/off" and "temperature" are prohibited. Accordingly, the control flow execution unit 84 requests the control panel 28 to display an error notification without starting execution of the control flow of FIG. 10.

With the operation of FIG. 12, the control of IoT devices 30 that an organization such as a company possesses is collectively managed throughout the entire organization based on the control flows of the IoT devices 30 provided by the IoT server 10. Further, with the operation of FIG. 12, by connecting the image forming apparatus 22 that is located one by one in one room to the IoT controller 24, an authorized user is able to select a control flow that is to be executed individually on a specific group-by-group basis, such as an office-by-office basis or a room-by-room basis.

Therefore, for example, in a case in which the control of air conditioners is collectively managed within a company or in a building, an operation is possible in which an authorized user selects a control flow of the IoT device 30 in a certain office from the control flows provided from the IoT server 10. By enabling such an authorized user to select the control flow, the operation of FIG. 12 ensures security.

Figure 14:
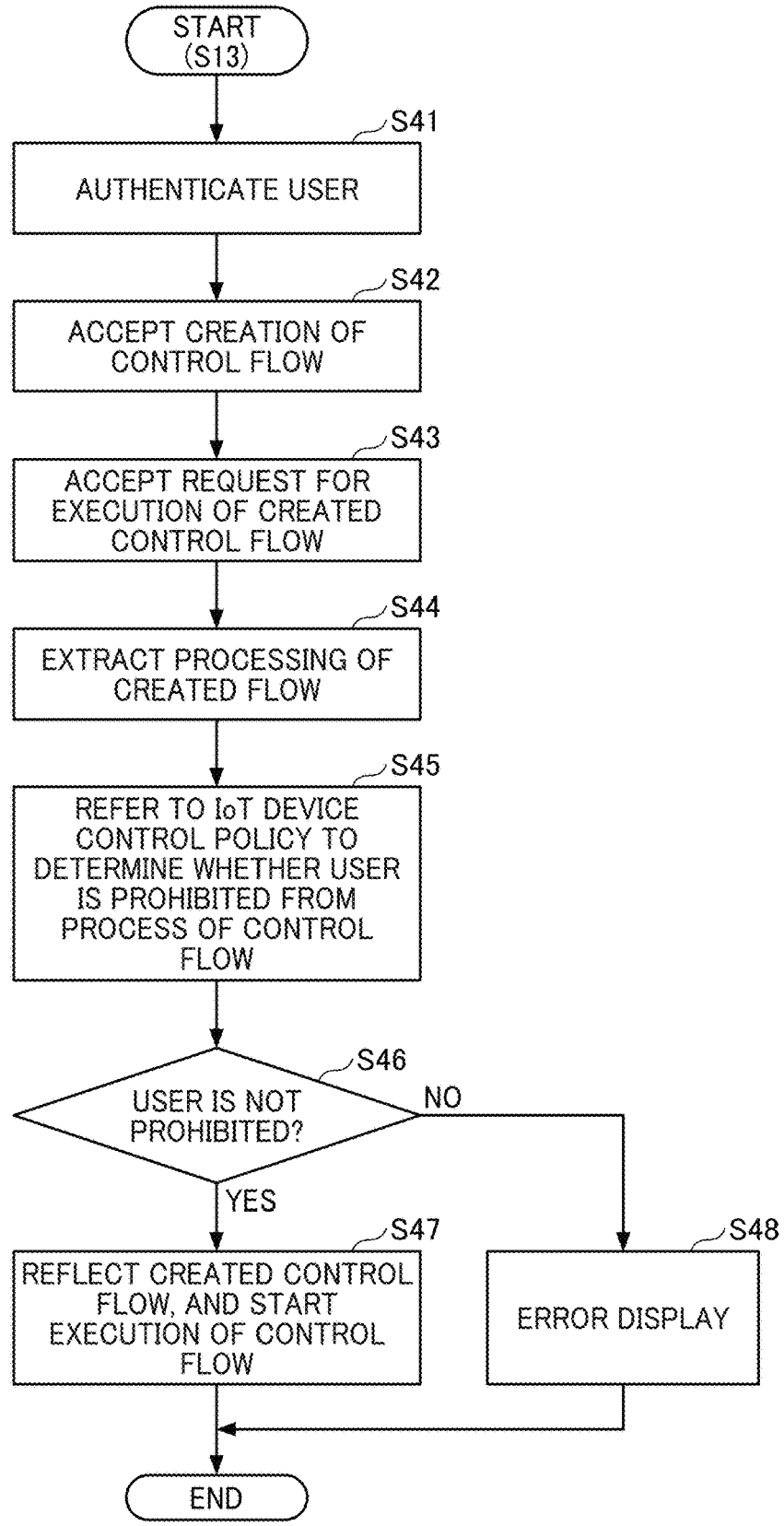
FIG. 14 is a flow chart illustrating another example of detailed processes performed at S13 of the flowchart of FIG. 9.

The process of FIG. 13 may be also implemented by an operation as illustrated in FIG. 14. FIG. 14 is a flowchart illustrating another example of variation of the detailed processes performed at S13. At S41, the control flow execution unit 84 of the IoT controller 24 authenticates a user operating the control panel 28 and identifies the user information of the user operating the control panel 28.

Figure 15:
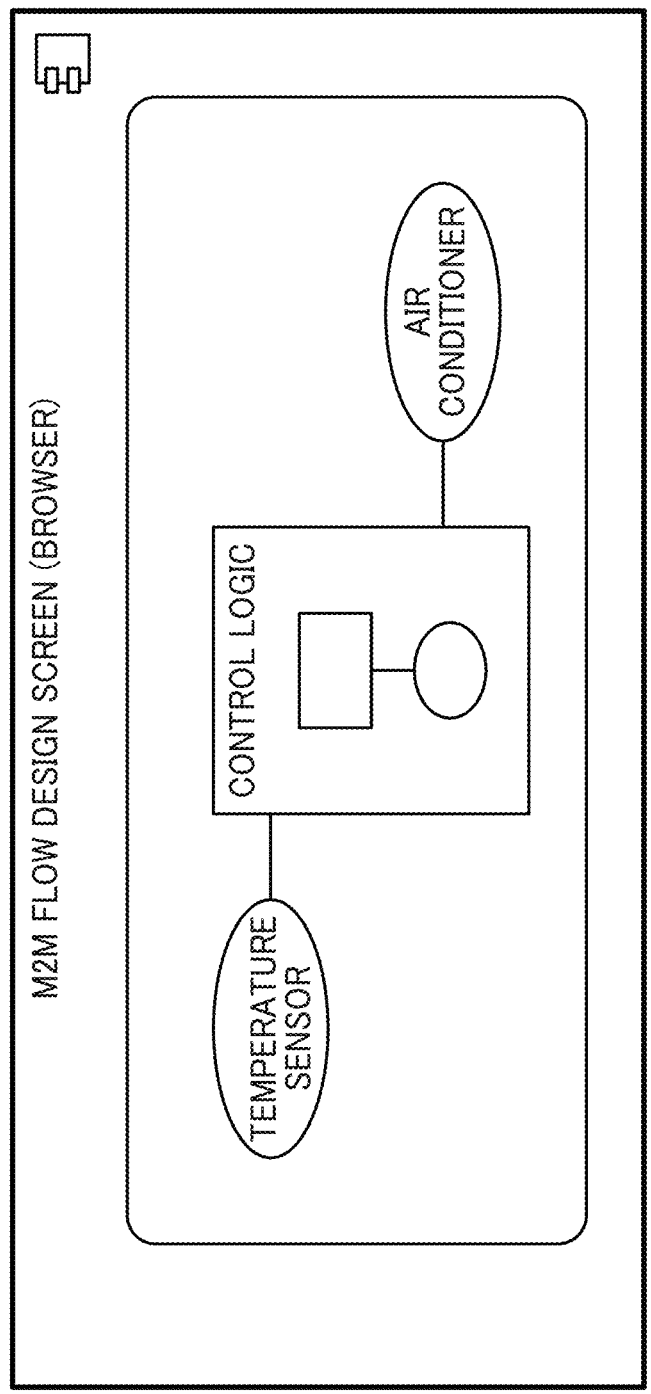
FIG. 15 illustrates an example of a control flow creation screen according to an embodiment of the present disclosure.

At S42, the control flow creation acceptor 71 of the control panel 28 displays a control flow creation screen as illustrated in FIG. 15, for example, to accept creation of a control flow from a user. FIG. 15 illustrates an example of the control flow creation screen. The control flow creation screen of FIG. 15 is an example screen on which a control flow is generated that controls an air conditioner as one of the IoT devices 30 based on data (temperature data) that is output from a temperature sensor as another one of the IoT devices 30. For example, Node-RED, which is an example of application development tool, can be used for the control flow creation screen.

For example, an example of the control flow created by the user at S42 is the control flow illustrated in FIG. 10. A control logic created on the control flow creation screen corresponds to data indicating the conditions and processes of the control flow of FIG. 10. In addition, the temperature senor and the air conditioner displayed on the control flow creation screen of FIG. 15 can be selected from the IoT devices 30 registered at S12 of FIG. 9. In addition, the control logic displayed on the control flow creation screen of FIG. 15 can be created based on the functions of the IoT device 30 that are grasped by executing S12 of FIG. 9.

It should be noted that the processes up to the creation of the control flow on the control flow creation screen in FIG. 15 may be permitted to a user who is not authenticated at S41. Further, the creation of the control flow on the control flow creation screen may be performed from, in addition to the control panel 28, a user terminal that is communicable with the IoT controller 24.

At S43, the control flow execution unit 84 receives, from a user, a request for executing the control flow created by a user at S42. At S44, the control flow execution unit 84 extracts processes of the control flow created by the user. The processes of the control flow extracted at S44 are processes of the IoT device 30 required for executing the control flow created by the user.

At S45, the control flow execution unit 84 identifies a role included in the user information of the user operating the image forming apparatus 22. Further, the control flow execution unit 84 refers to the IoT device control policy as illustrated in FIG. 13 to identify processes that are permitted and processes that are prohibited corresponding to the role of the user operating the image forming apparatus 22.

The control flow execution unit 84 compares the processes permitted and processes prohibited corresponding to the role of the user operating the image forming apparatus 22 with the processes of the IoT device 30 required for executing the control flow created by the user. Based on the comparison result, the control flow execution unit 84 determines whether or not the user operating the image forming apparatus 22 is prohibited for the processes of the IoT device 30 required for executing the control flow created by the user.

In other words, the control flow execution unit 84 determines, based on the IoT device control policy as illustrated in FIG. 13, whether the user who created the control flow is a user to whom the processes of the created control flow are permitted.

When the control flow execution unit 84 determines that the processes required for executing the created control flow are permitted to the user operating the image forming apparatus 22 (S46: YES), the operation proceeds to S47. At S47, the control flow execution unit 84 starts an update of the control flows stored in the control flow storage 94 to reflect the control flow created by the user at S42, and starts execution of the created control flow. When the control flow execution unit 84 determines that the processes required for executing the created control flow are prohibited to the user operating the image forming apparatus 22 (S46: NO), the operation proceeds to S48. At S48, the control flow execution unit 84 instructs the control panel 28 to display an error message, for example.

In other words, in a case in which a user who created a new control flow is a user to whom the processes of the created control flow are permitted, the control flow execution unit 84 starts the reflection and execution of the control flow created by the user. By contrast, in a case in which a user who created a new control flow is a user to whom the processes of the created control flow are prohibited, the control flow execution unit 84 does not start the reflection and execution of the control flow created by the user.

With the operation of FIG. 14, an authorized user is able to create a control flow individually on a specific group-by-group basis, such as an office-by-office basis, and instruct execution of the created control flow. For example, an operation is possible in which a control flow is generated and executed by a room-by-room basis, by connecting the IoT controller 24 to the image forming apparatus 22 that is located one by one in one room.

A description is given hereinafter of an example in which the information processing system 1 according to the present embodiment is executing the control flow as illustrated in FIG. 10 that controls an air conditioner as the IoT device 30 to prevent temperature from being lower than a predetermined degree throughout a building. Further, in this example, it is assumed that the operation of one or more IoT devices 30 installed in an office is controlled by other one or more IoT devices 30 in the office.

In this example, there may be a case in which one wants to execute a control flow that controls an air conditioner as one of the IoT devices 30 in cooperation with a temperature sensor as another one the IoT devices 30, only in an office in which an employee works on a holiday. However, if anyone can freely select and execute a desired control flow, problems in security and safety may occur.

The information processing system 1 according to the present embodiment enables to change flexibly the control flow in units of the IoT devices 30 belonging to a specific group, while ensuring security and safety.

In a case in which the processes of the IoT device 30 required for executing a control flow are partly prohibited to a user operating the image forming apparatus 22, the control flow execution unit 84 may perform operation as follows. For example, the control flow execution unit 84 may present a control flow from which the prohibited process is excluded and the content of the excluded process to a user, thereby accepting selection as to whether the presented control flow is to be executed from the user.

When the accepted selection indicates that the control flow is to be executed, the control flow execution unit 84 does not execute the control flow from which the prohibited process is excluded. By contrast, when the accepted selection indicates that the control flow is not to be executed, the control flow execution unit 84 starts the reflection and execution of the control flow from which the prohibited process is excluded.

For example, it is assumed that the control flows includes a first process of "notifying a user terminal that conditions are satisfied" and a second process of "turning on an air conditioner", and the first process is permitted to a general user and the second process is prohibited to a general user. In the policy, the process of "notifying a user terminal that conditions are satisfied" is not prohibited. Accordingly, a control flow of the process of "notifying a user terminal that conditions are satisfied" may be executed by a general user.

In this case, the control flow execution unit 84 may present to a user information indicating that although the turning on of an air conditioner is prohibited, sending a notification to a user when the conditions of a temperature sensor are satisfied is permitted, thereby enabling the user to select whether to execute this control flow. Further, the control flow execution unit 84 may reflect and execute the control flow from which the prohibited process is excluded, without presenting the information as described above.

<Variations>

In the first embodiment, a description is given of an example in which operation of an air conditioner as one example of the IoT device 30 is controlled in cooperation with a temperature senor as another example of the IoT device 30 according to the control flow. However, this is just one example of the control flow.

In another example, an air conditioner as one example of the IoT device 30 is controlled in cooperation with a lighting device as another example of the IoT device 30 according to a control flow. For example, in response to turning on the power of the lighting device, the air conditioner is turned on. In still another example, a lighting device and an air conditioner, both of which are examples of the IoT device 30, are controlled in cooperation with a projector as another example of the IoT device 30. For example, in response to turning on the power of the projector, the power of the lighting device is turned on, and the set temperature of the air conditioner is lowered.

In still another example, in response to turning on the power of the projector as one example of the IoT device 30, the brightness of the lighting device as another example of the IoT device 30 is lowered, and the set temperature of the air conditioner as another example of the IoT device 30 is lowered, according to the control flow.

According to embodiments of the present disclosure, a control flow is defined in units of devices belonging to a group.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

The information processing system 1 described in the above embodiments is just an example, and there may be various system configurations depending on applications or purposes.

The present disclosure can be implemented in any convenient form, for example using dedicated hardware, or a mixture of dedicated hardware and software. The present disclosure may be implemented as computer software implemented by one or more networked processing apparatuses. The network can include any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus comprising:
a memory to store,
policy data in which at least one of a first user to whom at least one process of at least one device belonging to a group is permitted and a second user to whom at least one process of at least one device belonging to the group is prohibited is set, and
a control flow that associates at least one condition with at least one process of at least one device that is to be executed when the at least one condition is satisfied; and
circuitry to cause the information processing apparatus to,
determine whether the at least one process associated with the at least one condition is at least one of permitted and not prohibited to a user making a request for execution of the control flow according to the policy data, the user making the request for execution of the control flow being the first user or the second user, and
control the at least one process of the at least one device belonging to the group according to the control flow when the at least one process of the at least one device is determined to be at least one of permitted and not prohibited.

2. The information processing apparatus of claim 1, wherein
when the request for executing is a request for executing a created control flow that has been created by the user making the request for execution of the control flow, the circuitry updates data of the control flow stored in the memory to reflect the created control flow.

3. The information processing apparatus of claim 2, wherein
the circuitry is configured to cause the information processing apparatus to obtain a control flow of an organization containing the group from a server apparatus via a network, and stores the obtained control flow in the memory.

4. The information processing apparatus of claim 1, wherein
the circuitry is configured to cause the information processing apparatus to
search for the at least one device belonging to the group, the at least one device connected to the information processing apparatus via a network,
register the at least one device that is searched in the memory; and
start receiving data from the at least one device that is registered.

5. The information processing apparatus of claim 1, wherein
the circuitry is configured to cause the information processing apparatus to obtain the policy data from a server apparatus and store the obtained policy data in the memory.

6. The information processing apparatus of claim 1, wherein
the information processing apparatus is connected to a network via a given device of the at least one device, and
the circuitry is configured to cause the information processing apparatus to perform data communication via the network using a communication function of the given device.

7. The information processing apparatus of claim 6, wherein
the circuitry is configured to cause the information processing apparatus to accept the request for execution of the control flow using a control panel connected to the given device.

8. The information processing apparatus of claim 6, wherein
the circuitry is configured to cause the information processing apparatus to authenticate the user making the request for execution of the control flow using an authentication apparatus connected to the given device.

9. The information processing apparatus of claim 6, wherein
the circuitry is configured to cause the information processing apparatus to accept a request for creating a control flow from the user making the request for execution of the control flow using a control panel connected to the given device.

10. The information processing apparatus of claim 6, wherein
the circuitry is configured to cause the information processing apparatus to accept a request for creating a control flow from a user operating a user terminal connected via the network.

11. The information processing apparatus of claim 1, wherein
in a case in which a part of the at least one process of the control flow of which execution is requested is prohibited to the user making the request for execution of the control flow the circuitry makes the control flow from which the part that is prohibited is excluded effective, and
the circuitry is configured to cause the information processing apparatus to control the at least one process of the at least one device based on the control flow that is made effective.

12. The information processing apparatus of claim 1, wherein the at least one device includes an image forming apparatus and at least one other device.

13. The information processing apparatus of claim 12, wherein the circuitry is configured to cause the information processing apparatus to communicate with the at least one other device using the image forming apparatus.

14. A method for controlling information processing apparatus, the method comprising:
storing, in a memory, policy data in which at least one of a first user to whom at least one process of at least one device belonging to a group is permitted and a second user to whom at least one process of at least one device belonging to the group is prohibited is set;
storing, in the memory, a control flow that associates at least one condition with at least one process of at least one device that is to be executed when the at least one condition is satisfied;
determining whether the at least one process associated with the at least one condition is at least one of permitted and not prohibited to a user making a request for execution of the control flow is accepted, according to the policy data, the user making the request for execution of the control flow being the first user or the second user; and
controlling the at least one process of the at least one device belonging to the group according to the control flow when the determining determines the at least one process of the at least one device is at least one of permitted and not prohibited.

15. An information processing system comprising:
a memory to store,
- policy data in which at least one of a first user to whom at least one process of at least one device belonging to a group is permitted and a second user to whom at least one process of at least one device belonging to the group is prohibited is set, and
- a control flow that associates at least one condition with at least one process of at least one device that is to be executed when the at least one condition is satisfied; and one or more processors to cause the information processing system to,
- determine whether the at least one process associated with the at least one condition is at least one of permitted and not prohibited to a user making a request for execution of the control flow according to the policy data, the user making the request for execution of the control flow being the first user or the second user, and
- control the at least one process of the at least one device belonging to the group according to the control flow when the at least one process of the at least one device is determined to be at least one of permitted and not prohibited.

16. The information processing system of claim 15, wherein the at least one device includes an image forming apparatus and at least one other device.

17. The information processing system of claim 16, further comprising:
- a control device including the memory and the one or more processors, wherein the control device is configured to communicate with the at least one other device using the image forming apparatus.

18. The information processing system of claim 17, wherein the at least one other device is an air conditioner, a lighting device, a multifunction peripheral, an electronic whiteboard, a projector, a projection or any combination thereof.

* * * * *